(12) United States Patent
Yang et al.

(10) Patent No.: US 9,007,786 B2
(45) Date of Patent: Apr. 14, 2015

(54) SWITCHING CONTROLLER FOR FLYBACK POWER CONVERTERS WITHOUT INPUT CAPACITOR

(75) Inventors: Ta-Yung Yang, Taoyuan (TW); Li Lin, Taipei (TW); Chao-Chih Lin, Guanyin Towship, Taoyuan County (TW)

(73) Assignee: System General Corporation, New Taipei (TW)

( * ) Notice: Subject to any disclaimer, the term of this patent is extended or adjusted under 35 U.S.C. 154(b) by 760 days.

(21) Appl. No.: 13/348,963

(22) Filed: Jan. 12, 2012

(65) Prior Publication Data

US 2013/0027988 A1 Jan. 31, 2013

Related U.S. Application Data

(60) Provisional application No. 61/513,229, filed on Jul. 29, 2011.

(51) Int. Cl.
*H02M 3/335* (2006.01)
*H02M 1/00* (2006.01)

(52) U.S. Cl.
CPC .. *H02M 3/33507* (2013.01); *H02M 2001/0022* (2013.01)

(58) Field of Classification Search
CPC ............ H02M 3/335; H02M 3/33507; H02M 2001/002
USPC ......... 363/16, 21.01, 21.12, 21.15, 21.18, 34, 363/124; 323/235, 282, 284
See application file for complete search history.

(56) References Cited

U.S. PATENT DOCUMENTS

| | | | |
|---|---|---|---|
| 2010/0110739 A1* | 5/2010 | Nishikawa | ..................... 363/124 |
| 2013/0088078 A1* | 4/2013 | Shteynberg et al. | ........ 363/21.01 |
| 2013/0094247 A1* | 4/2013 | Kleinpenning | ................. 363/16 |

* cited by examiner

*Primary Examiner* — Adolf Berhane
*Assistant Examiner* — Jye-June Lee
(74) *Attorney, Agent, or Firm* — McClure, Qualey & Rodack, LLP

(57) ABSTRACT

The present invention proposes a switching controller of a flyback power converter. The switching controller includes a switching circuit, a sample-and-hold circuit, a voltage detection circuit, an oscillation circuit, and a comparator. The voltage detection circuit generates a holding signal when a level of an input voltage of the flyback power converter is lower than a low-threshold. The oscillation circuit limits the maximum frequency of switching signal. The maximum frequency is increased in response to a decrement of a modulation signal. The modulation signal correlated with a level of the input voltage is used to generate a control signal when the level of the input voltage is lower than an ultra-low-threshold. The control signal is enabled to operate the flyback power converter in continuous current mode operation. Therefore, an input capacitor can be eliminated and manufacturing cost is saved.

15 Claims, 8 Drawing Sheets

US 9,007,786 B2

SWITCHING CONTROLLER FOR FLYBACK POWER CONVERTERS WITHOUT INPUT CAPACITOR

CROSS REFERENCE TO RELATED APPLICATIONS

This application claims the benefit of U.S. Provisional Application No. 61/513,229, filed on Jul. 29, 2011, the contents of which are incorporated herein by reference.

BACKGROUND OF THE INVENTION

1. Field of the Invention

The present invention generally relates to power converters, and more specifically, the present invention relates to a switching control circuit for flyback power converters.

2. Description of the Related Art

FIG. 1A shows a conventional flyback power converter. The power converter comprises a bridge rectifier 35, an input capacitor 36, a controller 90, a transformer 10, a power transistor 20, a detection resistor 31, a rectifier 40, an output capacitor 45, a secondary feedback circuit. The transformer 10 includes a primary winding $N_P$, a secondary winding $N_S$, and an auxiliary winding $N_A$. The secondary feedback circuit comprises a resistor 52, a zener diode (served as a voltage regulator) 60 and an opto-coupler 50. The bridge rectifier 35 converts an alternating current (AC) input voltage $V_{AC}$ to a pulsating direct current (DC) input voltage $V_{IN}$. This input voltage $V_{IN}$ is further filtered by the input capacitor 36 to become a nearly direct current input voltage $V_{IN}$ with only relatively small ripple. The controller 90 generates a switching signal $S_W$ coupled to switch the transformer 10 via the power transistor 20. The rectifier 40 and the output capacitor 45 are coupled to the secondary winding $N_S$ of the transformer 10 for generating an output voltage $V_O$ of the power converter. The switching signal $S_W$ is generated in response to a feedback signal $V_{FB}$ for regulating the output voltage $V_O$ of the power converter. The feedback signal $V_{FB}$ is coupled to an output of the power converter via the secondary feedback circuit. The feedback signal $V_{FB}$ is correlated with the output voltage $V_O$ of the power converter. The input capacitor 36 is utilized to store the energy and provide a minimum input voltage $V_{IN}$ to guarantee a proper operation of the power converter. Without the filtering operation of the input capacitor 36, the pulsating direct current input voltage $V_{IN}$ will result in higher output line ripple and none-linearly power converting operation. Furthermore, the input capacitor 36 is generally occupies significant space of the power converter. Whenever the input capacitor 36 can be eliminated, the advantages to the power converter will be longer life, smaller size, and greatly reduced manufacturing cost.

Therefore, a controller capable of regulating an output voltage of the power converter without the need of the input capacitor is desired by the industries.

BRIEF SUMMARY OF THE INVENTION

The present invention proposes a switching controller of a flyback power converter. The switching controller comprises a switching circuit, a sample-and-hold circuit, a voltage detection circuit, an oscillation circuit and a comparator. The switching circuit generates a switching signal coupled to switch a transformer for regulating an output voltage of the flyback power converter in response to a feedback signal. The sample-and-hold circuit is coupled to the switching circuit to hold the feedback signal in response to a holding signal. The voltage detection circuit generates the holding signal when a level of an input voltage of the flyback power converter is lower than a low-threshold. The feedback signal is generated in response to the output voltage of the flyback power converter. The oscillation circuit limits a maximum frequency of the switching signal. The maximum frequency is increased in response to a decrement of a modulation signal. The modulation signal is correlated with the level of the input voltage. The maximum frequency is increased once the modulation signal is lower than a threshold. The comparator generates a control signal when the level of the input voltage is lower than an ultra-low-threshold. The control signal is enabled to operate the flyback power converter in continuous current mode operation. The flyback power converter is operated in boundary current mode operation and/or discontinuous current mode operation when the level of the input voltage is higher than the ultra-low-threshold.

The present invention also proposes a controller of a power converter. The controller comprises a switching circuit, a voltage detection circuit, an oscillation circuit, a sample-and-hold circuit, and a comparator. The switching circuit generates a switching signal coupled to switch a transformer for regulating an output voltage of the power converter in response to a feedback signal. The voltage detection circuit generates a modulation signal in response to a level of an input voltage of the power converter. The oscillation circuit limits a maximum frequency of the switching signal. The feedback signal is generated in response to the output voltage of the power converter. The maximum frequency is increased in response to a decrement of a modulation signal. The maximum frequency is increased when a level of the modulation signal is lower than a threshold. The sample-and-hold circuit is coupled to hold the feedback signal in response to a holding signal. The voltage detection circuit generates the holding signal when the level of the input voltage is lower than a low-threshold. The comparator generates a control signal when the level of the input voltage is lower than an ultra-low-threshold. The control signal is enabled to operate the power converter in continuous current mode operation. The power converter is operated in boundary current mode operation and/or discontinuous current mode operation when the level of the input voltage is higher than an ultra-low-threshold.

The present invention also proposes a control circuit of a power converter. The control circuit comprises a switching circuit, a voltage detection circuit, a comparator, an oscillation circuit and a sample-and-hold circuit. The switching circuit generates a switching signal coupled to switch a transformer for regulating an output voltage of the power converter in response to a feedback signal. The voltage detection circuit generates a modulation signal in response to a level of an input voltage of the power converter. The comparator generates a control signal when a level of the modulation signal is lower than an ultra-low-threshold. The feedback signal is generated in response to the output voltage of the power converter. The control signal is enabled to operate the power converter in continuous current mode operation. The power converter is operated in boundary current mode operation and/or discontinuous current mode operation when the level of the input voltage is higher than the ultra-low-threshold. The oscillation circuit limits a maximum frequency of the switching signal. The maximum frequency is increased in response to a decrement of the modulation signal. The modulation signal is correlated with a level of the input voltage. The maximum frequency is increased when the level of the modulation signal is lower than a threshold. The sample-and-hold circuit is coupled to hold the feedback signal in response to a holding signal. The voltage detection circuit generates the holding signal when the level the input voltage is lower than a low-threshold.

It is an object of the present invention to provide a switching controller capable of regulating a power converter without the input capacitor.

It is another object of the present invention to reduce output ripple whenever an input capacitor is not available.

It is still another object of the present invention to provide a well output regulation without being affected by a pulsating direct current of an input voltage of a power converter.

It is still another object of the present invention to greatly reduce the manufacturing cost for the power converter.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1A:
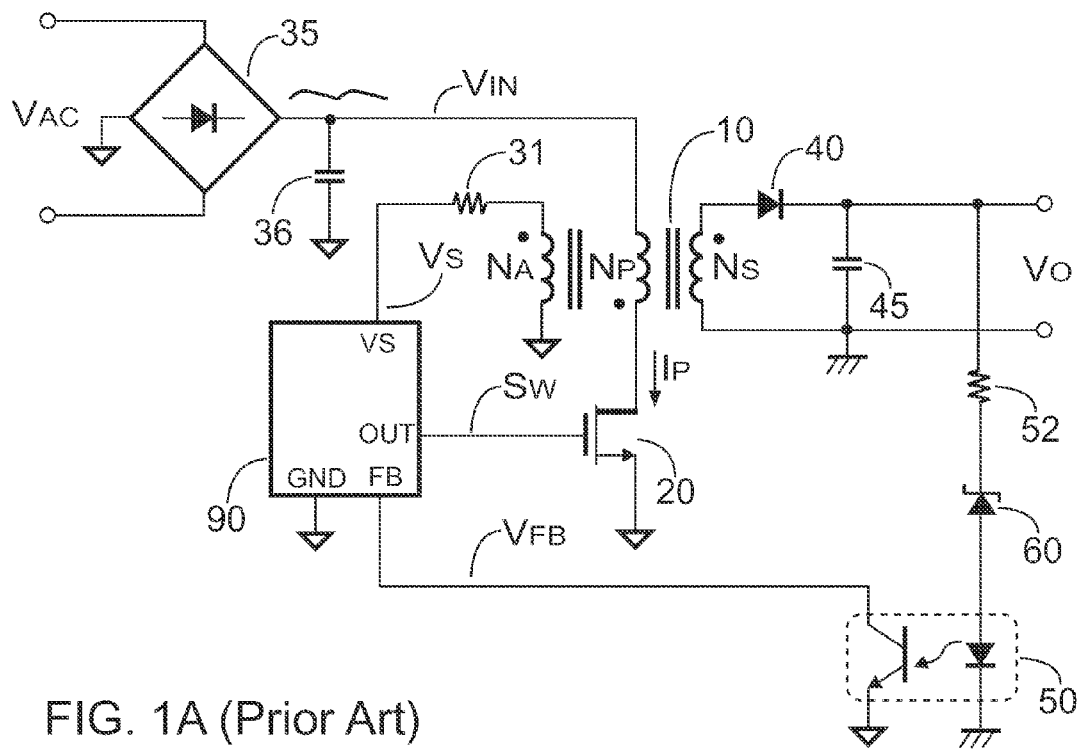
FIG. 1A shows a conventional flyback power converter having an input capacitor.
Figure 1B:
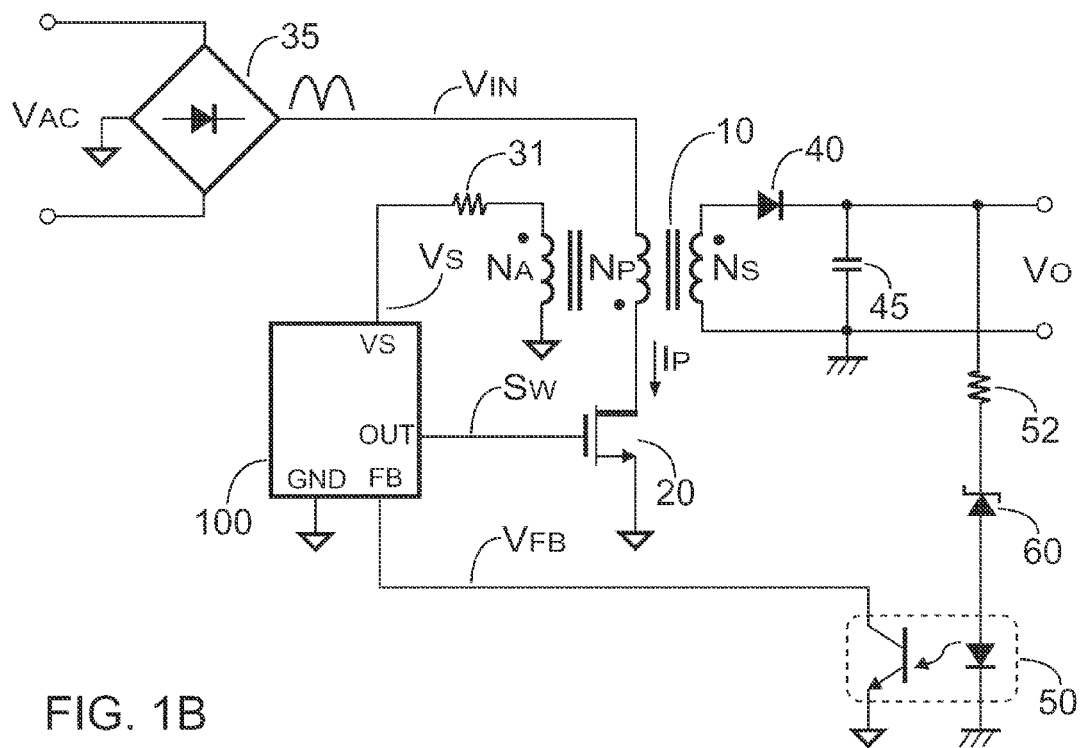
FIG. 1B shows an exemplary embodiment of a flyback power converter without an input capacitor according to the present invention.

FIG. 1B shows an exemplary embodiment of a flyback power converter according to the present invention. The only difference between FIG. 1A and FIG. 1B is that the embodiment depicted in FIG. 1B utilizes a switching controller 100 to eliminate the need of the input capacitor 36 shown in FIG. 1A for performing normal output regulation for the power converter.

An output power $P_O$ of the flyback power converter can be expressed as, $$P_O = V_O \times I_O = \frac{V_{IN}^2 \times T_{ON}^2}{2 \times L_P \times T} \quad (1)$$

where $V_{IN}$ represents the level of the input voltage $V_{IN}$; $T_{ON}$ is an on-time of a switching signal $S_W$; $L_P$ represents an inductance of a primary winding $N_P$ of the transformer 10; T represents a switching period of the switching signal $S_W$.

Normally, the maximum of the on-time $T_{ON}$ of the switching signal $S_W$ is limited to prevent from saturation of the transformer. Thus, the output power $P_O$ and/or the output voltage $V_O$ of the power converter will become lower once the input voltage $V_{IN}$ drops to a valley zone (close to zero voltage), which will result in the feedback open loop and higher output ripple. The feedback signal $V_{FB}$ will be pulled high and induce overshoot/undershoot condition at the output of the power converter in response to the changes of the input voltage $V_{IN}$. Particularly, this situation could be worse at the valley zone of the input voltage $V_{IN}$. According to the present invention, the proposed switching controller 100 overcomes this problem, which reduces the output ripple and achieves a stable feedback loop for the power converter.

Figure 2:
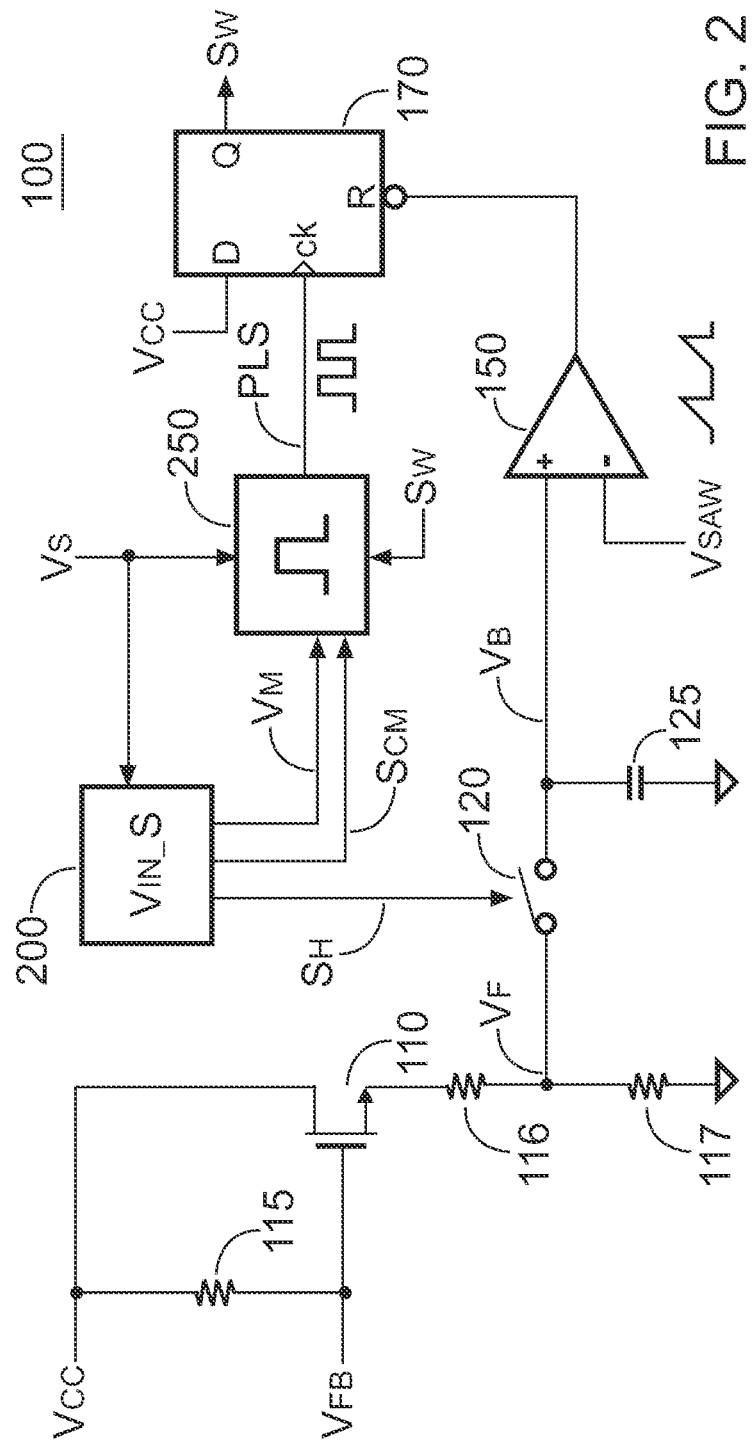
FIG. 2 shows an exemplary embodiment of a switching controller of the power converter shown in FIG. 1B according to the present invention.

FIG. 2 shows an exemplary embodiment of the switching controller 100 according to the present invention. The switching controller 100 comprises a level-shift circuit, a sample-and-hold circuit, a voltage detection circuit 200 ($V_{IN\_}$S), a pulse generation circuit 250, a comparator 150, and a flip-flop 170. The level-shift circuit is formed by a transistor 110 and resistors 115, 116, 117. The level-shift circuit generates a signal $V_F$ in response to the feedback signal $V_{FB}$. The sample-and-hold circuit is formed by a resistor 120 and a capacitor 125. As the switch 120 is turned on by a holding signal $S_H$, the signal $V_F$ will be conducted via the switch 120 to be a signal $V_B$ stored across the capacitor 125. The holding signal $S_H$ is generated by the voltage detection circuit 200. The holding signal $S_H$ is disabled to turn off the switch 120 once the input voltage $V_{IN}$ is lower than a low-threshold $V_{TA}$. Therefore, the signal $V_B$ will be held at its previous level once the input voltage $V_{IN}$ is lower than the low-threshold $V_{TA}$.

The signal $V_B$ is coupled to the comparator 150 to be compared with a saw-tooth signal $V_{SAW}$ to reset the flip-flop 170 for disabling the switching signal $S_W$. The switching signal $S_W$ is enabled by a pulse signal PLS via the flip-flop 170. The feedback signal $V_{FB}$ is in advance sampled and held as the signal $V_B$ before the input voltage $V_{IN}$ is lower than the low-threshold $V_{TA}$. Therefore, non-linear feedback loop can be avoided. The pulse signal PLS is generated by the pulse generation circuit 250 in response to a detection signal $V_S$, a modulation signal $V_M$, and a control signal $S_{CM}$. The detection signal $V_S$ is obtained from the auxiliary winding $N_A$ of the transformer 10. The modulation signal $V_M$ is correlated with the level of the input voltage $V_{IN}$. The maximum frequency of the pulse signal PLS and the switching signal $S_W$ is increased in response to the decrement of the level of the modulation signal $V_M$. The control signal $S_{CM}$ is generated once the input voltage $V_{IN}$ is lower than an ultra-low-threshold $V_{TB}$. The control signal $S_{CM}$ indicates that the power converter will be operated in CCM (continuous current mode) to increase the output power of the power converter. The CCM operation means that the switching signal $S_W$ starts its next switching cycle before the transformer 10 is fully demagnetized. That is, the energy is still stored in the transformer 10 when the switching signal $S_W$ is enabled to further store the energy into the transformer 10.

Figure 3A:
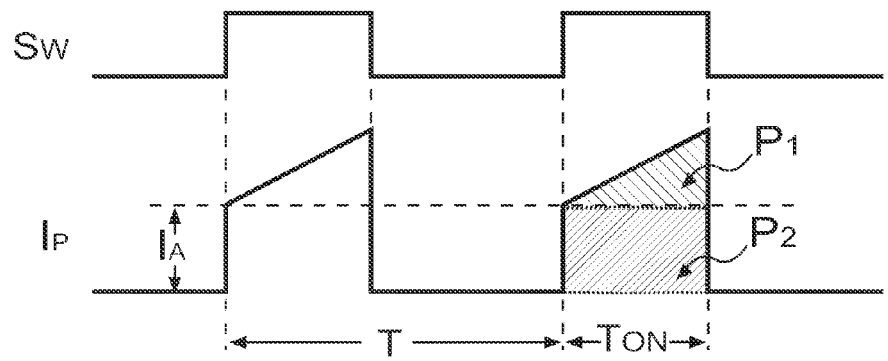
FIG. 3A shows waveforms of a switching signal and a primary-side switching current according to the present invention.

FIG. 3A shows waveforms of the switching signal $S_W$ and a primary-side switching current $I_P$ in the CCM operation. In a DCM (discontinuous current mode) operation, only the triangle area (a first output power denoted as $P_1$) is available during the switching signal $S_W$ is enabled. In the CCM operation, both of the triangle area and the rectangle area (a second output power denoted as $P_2$) are available during the switching signal $S_W$ is enabled. The output power $P_O$ of the power converter in the CCM operation can be expressed as equations (2), (3) and (4).

$$P_O = V_O \times I_O = P_1 + P_2 \qquad (2)$$

$$P_1 = \frac{V_{IN}^2 \times T_{ON}^2}{2 \times L_P \times T} \qquad (3)$$

$$P_2 = V_{IN} \times I_A \times \left(\frac{T_{ON}}{T}\right) \qquad (4)$$

where a current $I_A$ represents an initial magnitude of the primary-side switching current $I_p$ when the next switching is just started.

Compared to the output power $P_O$ of the power converter in DCM operation, the output power ($P_2$) can be further delivered. Referring to equation (3) and (4), a shortening switching period T can result in an increment of the output power $P_O$. This means that a higher switching frequency can increase the power density to increase the output power $P_O$. Therefore, according to the present invention, the switching controller 100 will increase the switching frequency of the power converter and enter a CCM operation to reduce the output ripple when the input voltage $V_{IN}$ is lower than the ultra-low-threshold $V_{TB}$.

Figure 3B:
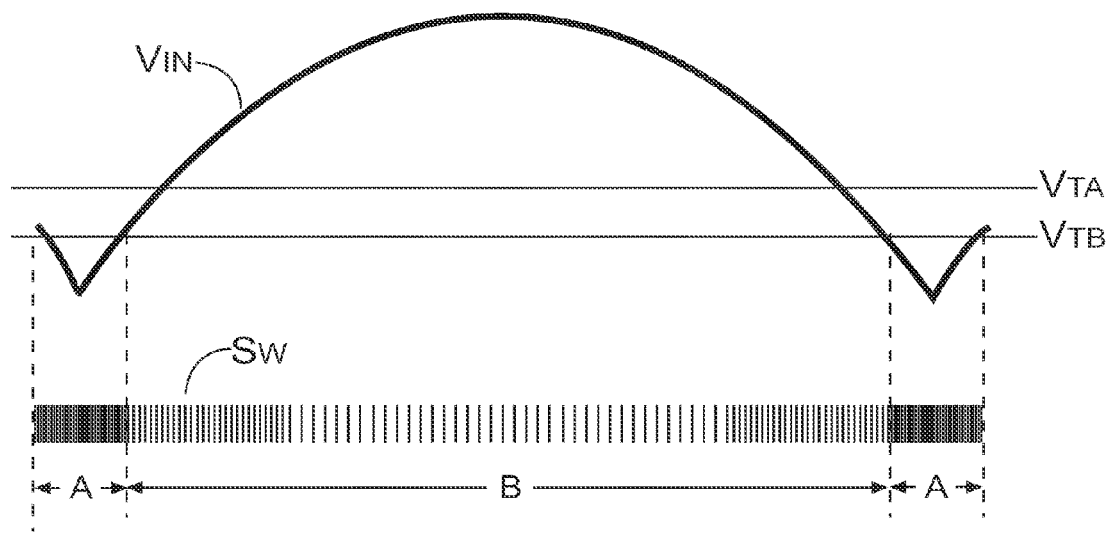
FIG. 3B shows waveforms of an input voltage and a switching signal according to the present invention.

FIG. 3B shows waveforms of the input voltage $V_{IN}$ and the switching signal $S_W$. in the CCM operation. Periods A presents the power converter entering the CCM operation.

Figure 4:
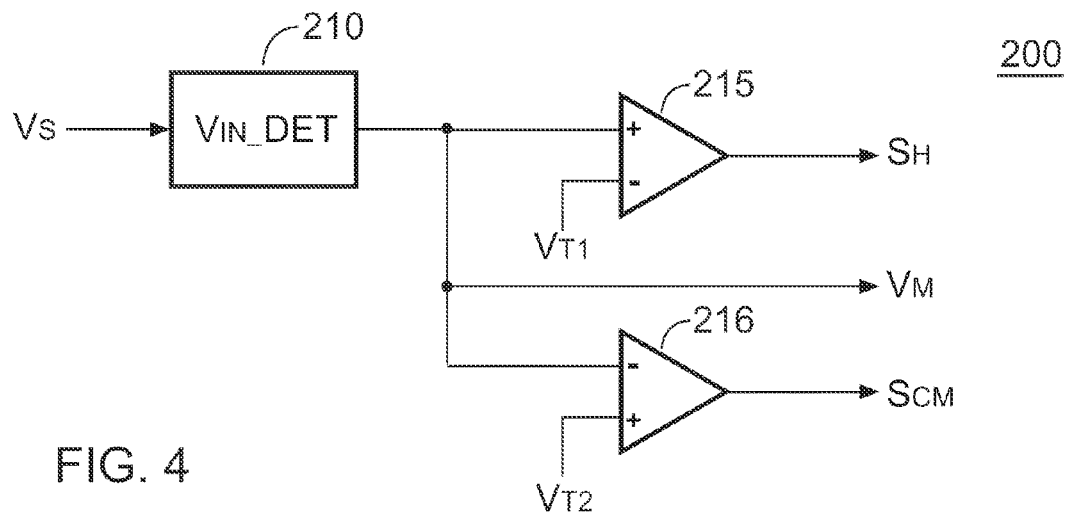
FIG. 4 shows an exemplary embodiment of a voltage detection circuit of the switching controller shown in FIG. 2 according to the present invention.

FIG. 4 shows an exemplary embodiment of the voltage detection circuit 200 according to the present invention. The voltage detection circuit 200 comprises an input-voltage detector 210 ($V_{IN\_}$DET) and comparators 215 and 216. The input-voltage detector 210 is coupled to detect the input voltage $V_{IN}$ by receiving the detection signal $V_S$ from the auxiliary winding $N_A$ of the transformer 10. The input-voltage detector 210 generates the modulation signal $V_M$ in response to the detection signal $V_S$. The detail operation of the input-voltage detector 210 can be found in the prior arts of U.S. Pat. No. 7,671,578 titled "Detection circuit for sensing the input voltage of transformer" and U.S. Pat. No. 7,616,461 titled "Control method and circuit with indirect input voltage detection by switching current slope detection". The modulation signal $V_M$ is further supplied to a positive terminal of the comparator 215 and a negative terminal of the comparator 216. A negative terminal of the comparator 215 receives a first threshold $V_{T1}$ which is in proportion to the low-threshold $V_{T4}$. A positive terminal of the comparator 216 receives a second threshold $V_{T2}$ which is in proportion to the ultra-low-threshold $V_{TB}$. The comparator 215 compares the modulation signal $V_M$ with the first threshold $V_{T1}$ to generate the holding signal $S_H$. The comparator 216 compares the modulation signal $V_M$ with the second threshold $V_{T2}$ to generate the control signal $S_{CM}$.

Figure 5:
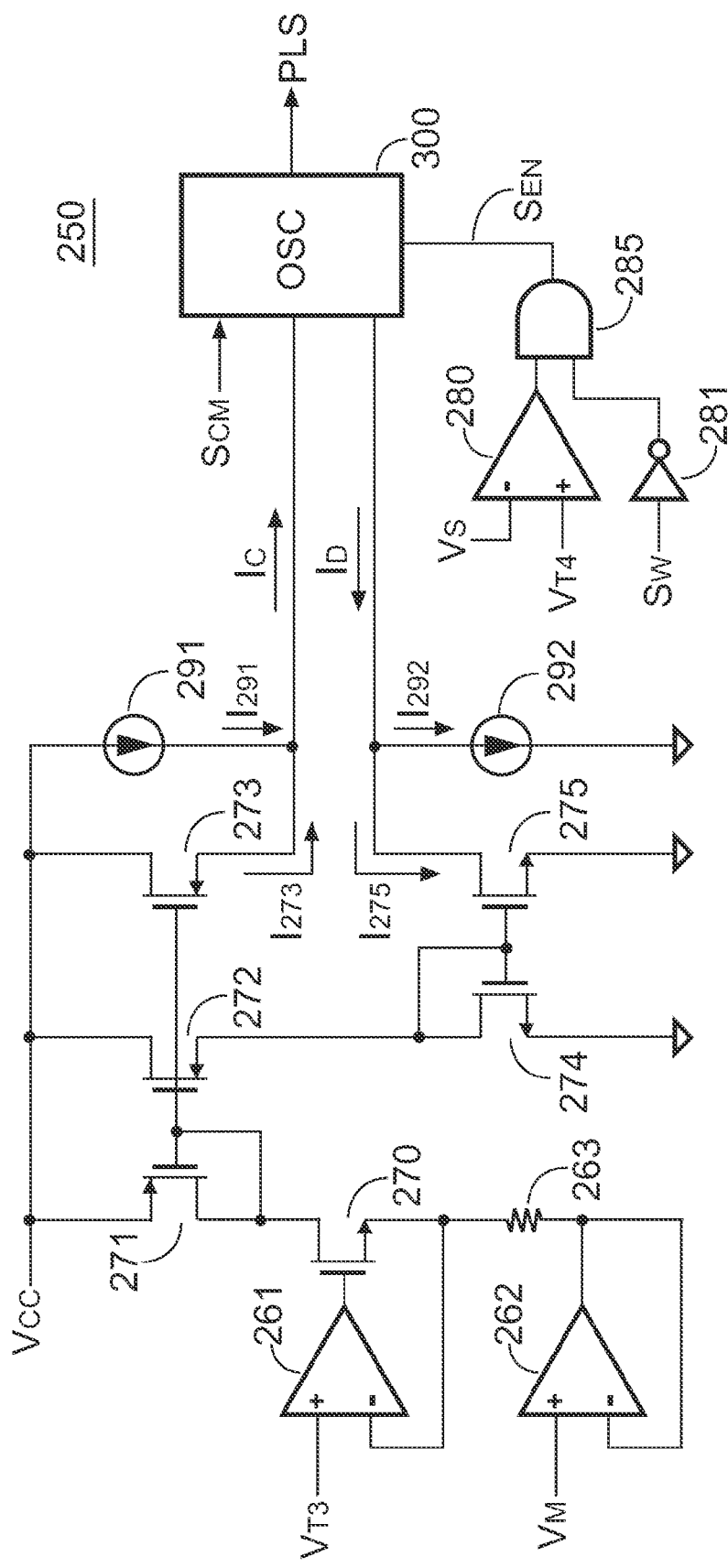
FIG. 5 shows an exemplary embodiment of a pulse generation circuit of the switching controller shown in FIG. 2 according to the present invention.

FIG. 5 shows an exemplary embodiment of the pulse generation circuit 250 according to the present invention. The pulse generation circuit 250 comprises a voltage-to-current converter, a current source 291, a current source 292, an oscillation circuit 300 (OSC) and an enabling circuit. The voltage-to-current converter is developed by operational amplifiers 261 and 262, a resistor 263, and transistors 270, 271, 272, 273, 274 and 275. The voltage-to-current converter generates a first charging current $I_{273}$ and a first discharging current $I_{275}$ in response to the result of subtracting the modulation signal $V_M$ from a third threshold $V_{T3}$. A second charging current $I_{291}$ provided by the current source 291 and the first charging current $I_{273}$ are summed to form a charging current $I_C$ for the oscillation circuit 300. A second discharging current $I_{292}$ provided by the current source 292 and the first discharging current $I_{295}$ are summed to form a discharging current $I_D$ for the oscillation circuit 300. As a result, the charging current $I_C$ and the discharging current $I_D$ are increased once the level of the modulation signal $V_M$ is decreased to be lower than the third threshold $V_{T3}$. The current sources 291 and 292 provide minimum magnitudes for the charging current $I_C$ and the discharging current $I_D$ respectively. The charging current $I_C$, the discharging current $I_D$, the control signal $S_{CM}$, and an enabling signal $S_{EN}$ are supplied to the oscillation circuit 300 to generate the pulse signal PLS. The increment of the charging current $I_C$ and the discharging current $I_D$ will increase the frequency of the pulse signal PLS and the switching frequency of the switching signal $S_W$.

The enabling circuit comprises a comparator 280, an inverter 281, and an AND gate 285. The detection signal $V_S$ is coupled to a negative terminal of the comparator 280 to compare with a fourth threshold $V_{T4}$ supplied to its positive terminal. As the switching signal $S_W$ is disabled and the detection signal $V_S$ is being lower than the fourth threshold $V_{T4}$, the comparator 280 will generate the enabling signal $S_{EN}$ via the AND gate 285. As the enabling signal $S_{EN}$ is enabled, it indicates the transformer 10 is fully demagnetized. When the pulse signal PLS and the switching signal $S_W$ are generated in response to the enabled enabling signal $S_{EN}$, the power converter operates in BCM (boundary current mode) operation. If the pulse signal PLS and the switching signal $S_W$ are generated before the enabling signal $S_{EN}$ is enabled, the power converter operates in the CCM operation.

Figure 6:
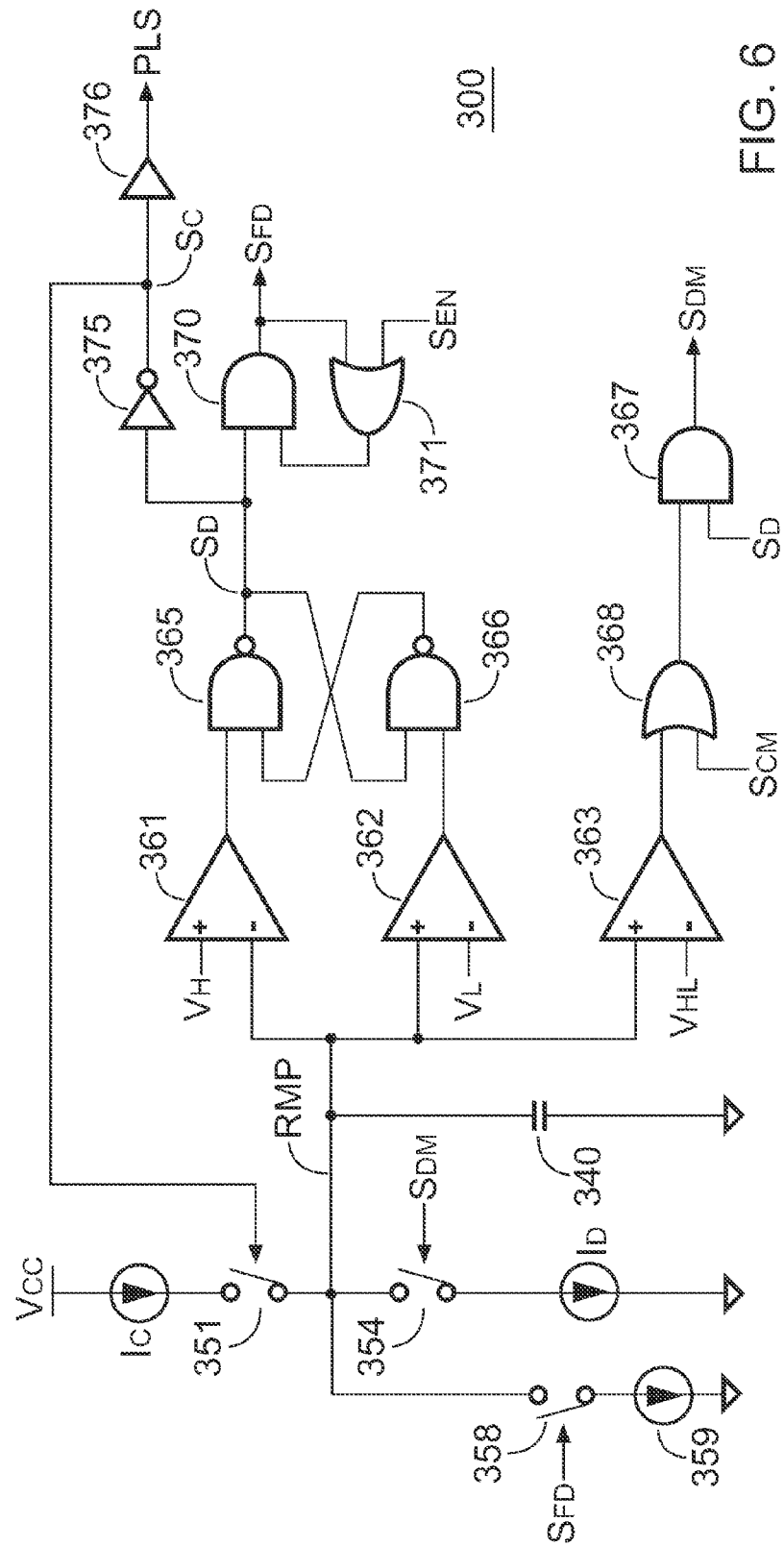
FIG. 6 shows an exemplary embodiment of an oscillation circuit of the pulse generation circuit shown in FIG. 5 according to the present invention.

FIG. 6 shows an embodiment of the oscillation circuit 300 according to the present invention. The oscillation circuit 300 comprises a current source 359, switches 351, 354, and 358, a capacitor 340, comparators 361, 362, and 363, a latch circuit, AND gates 367 and 370, OR gates 368 and 371, an inverter 375, and a buffer 376. The charging current $I_C$ charges the capacitor 340 via the switch 351. The discharging current $I_D$ discharges the capacitor 340 via the switch 354. The switch 351 is controlled by a charging signal $S_C$. The switch 354 is controlled by a discharging signal $S_{DM}$. The capacitor 340 thus generates a ramping signal RMP coupled to a negative terminal of the comparator 361 and positive terminals of the comparator 362 and 363. A threshold $V_H$ is supplied to a positive terminal of the comparator 361. Negative terminals of the comparators 362 and 363 are respectively supplied with thresholds $V_L$ and $V_{HL}$. The level of the threshold $V_H$ is higher than that of the threshold $V_{HL}$. The level of the threshold $V_{HL}$ is higher than that of the threshold $V_L$. NAND gates 365 and 366 form the latch circuit coupled to receive output signals of the comparators 361 and 362. The latch circuit outputs a discharging signal $S_D$. The discharging signal $S_D$ is a maximum frequency signal. An output signal of the comparator 363 is supplied to one input of the OR gate 368. The other input of the OR gate 368 is supplied with the control signal $S_{CM}$. The discharging signal $S_D$ and an output signal of the OR gate 368 are supplied to the AND gate 367 for generating the discharging signal $S_{DM}$. Therefore, the discharging signal $S_{DM}$ will not be dominated by the comparator 363 during the CCM operation when the control signal $S_{CM}$ is enabled. It means that the discharging signal $S_{DM}$ operates as the discharging signal $S_D$, and the discharging of the capacitor 340 will be not controlled by the enabling signal $S_{EN}$ during the CCM operation.

The discharging signal $S_D$ is supplied to the inverter 375 to generate the charging signal $S_C$. The charging signal $S_C$ is supplied to the buffer 376 to generate the pulse signal PLS. The discharging signal $S_D$ is further coupled to one input of the AND gate 370 to generate a fast-discharging signal $S_{FD}$. The fast-discharging signal $S_{FD}$ and the enabling signal $S_{EN}$ are supplied to inputs of the OR gate 371. An output of the OR gate 371 is connected to the other input of the AND gate 370. Therefore, the enabling signal $S_{EN}$ will trigger the fast-discharging signal $S_{FD}$ once the discharging signal $S_D$ is being enabled. The fast-discharging signal $S_{FD}$ can be disabled only when the discharging signal $S_D$ is disabled. The current source 359 is connected in series with the switch 358. The switch 358 is controlled by the fast-discharging signal $S_{FD}$. Since the current of the current source 359 is much higher than the discharging current $I_D$, the capacitor 340 will be immediately discharged when the fast-discharging signal $S_{FD}$ is enabled. During the discharging period of the capacitor 340, the ramping signal RMP is held at the level of the threshold $V_{HL}$ until the enabling signal $S_{EN}$ triggers the fast-discharging signal $S_{FD}$. It is used for the BCM and/or DCM operation. Once the ramping signal RMP is lower than the threshold $V_L$, the discharging signal $S_D$ will be disabled.

The enabling signal $S_{EN}$ is thus able to trigger the pulse signal PLS once the discharging signal $S_D$ is enabled. Therefore, the charging current $I_C$, the discharging current $I_D$, the capacitance of the capacitor 340, and thresholds $V_H$, $V_{HL}$, $V_L$ determine the maximum frequency of the discharging signal $S_D$ and further determine the maximum frequency of the switching signal $S_W$.

Figure 7:
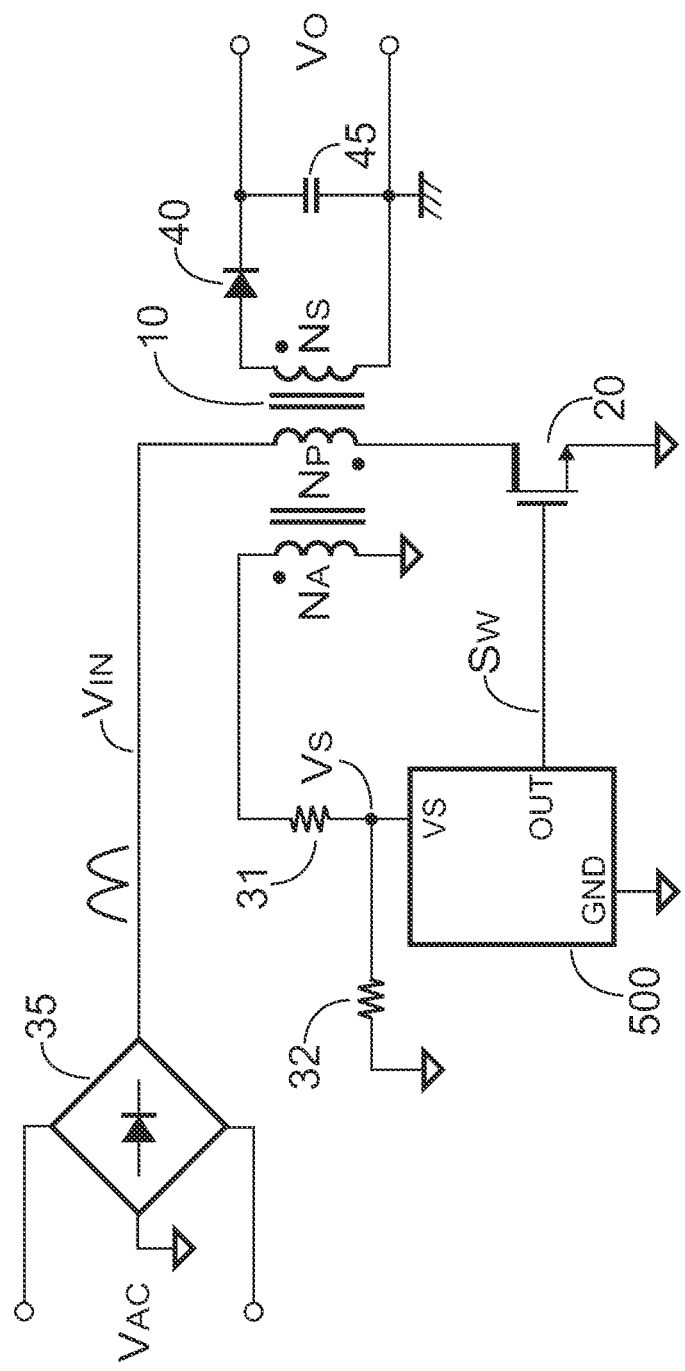
FIG. 7 shows another exemplary embodiment of the flyback power converter without the input capacitor according to the present invention.

FIG. 7 shows another exemplary embodiment of the flyback power converter without the input capacitor according to the present invention. The feedback loop herein is established via the primary-side of the transformer 10. The detection signal $V_S$ sensed from the auxiliary winding $N_A$ of the transformer 10 via resistors 31 and 32 also serves as the feedback signal $V_{FB}$ in the embodiment of FIG. 1B. A switching controller 500 generates the switching signal $S_W$ according to the feedback signal sensed from the auxiliary winding $N_A$ of the transformer 10.

Figure 8:
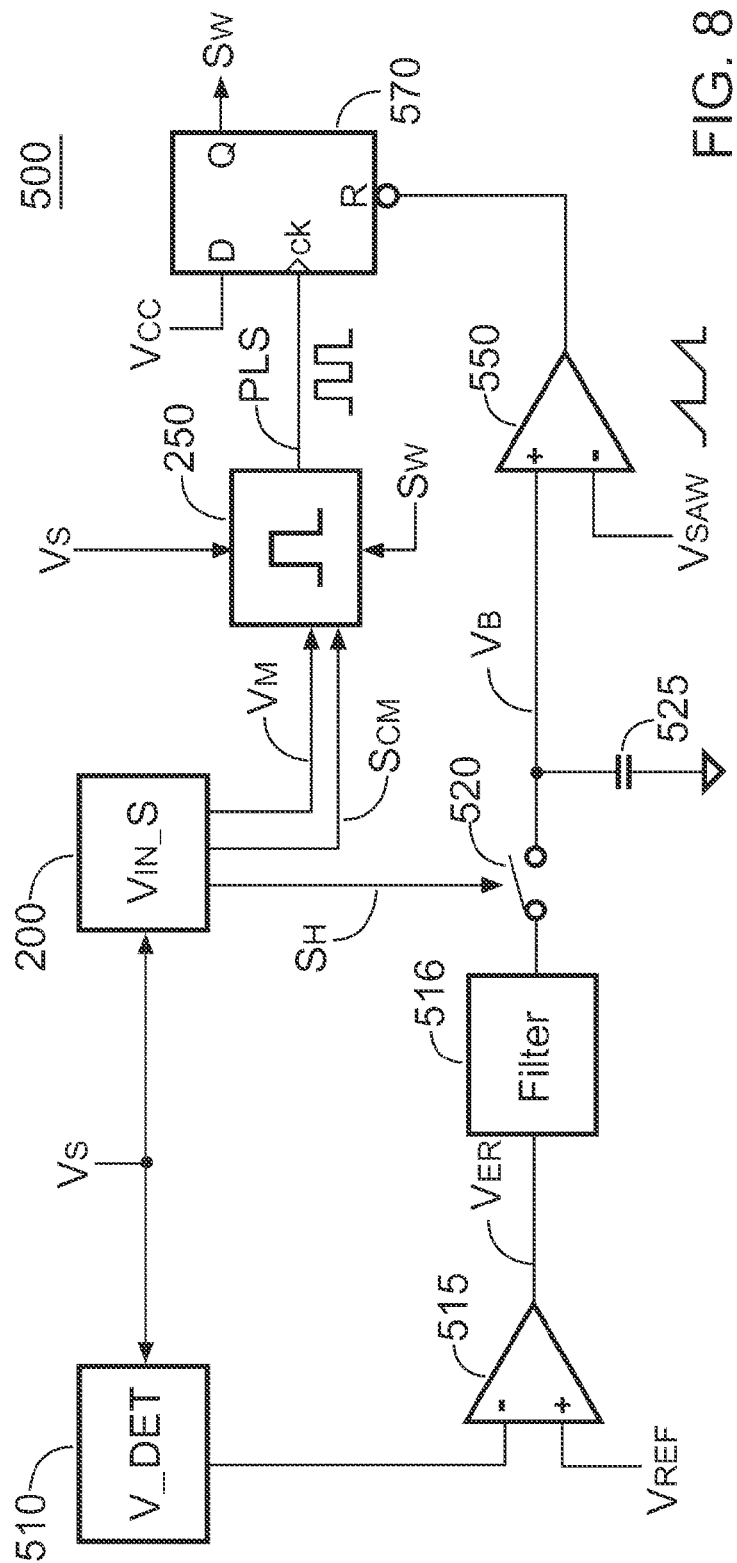
FIG. 8 shows an exemplary embodiment of a switching controller of the flyback power converter shown in FIG. 7 according to the present invention.

FIG. 8 shows an embodiment of the switching controller 500 of the flyback power converter in FIG. 7 according to the present invention. The switching controller 500 comprises a reflected-voltage detector 510 (V-DET), an operational amplifier 515, a filter 516, a sample-and-hold circuit, the voltage detection circuit 200 ($V_{IN\_S}$) shown in FIG. 2, the pulse generation circuit 250 shown in FIG. 2, a comparator 550, and a flip-flop 570. The difference between the controller 100 in FIG. 2 and the controller 500 in FIG. 8 is that the controller 500 uses the reflected-voltage detector 510, the operational amplifier 515, and the filter 516 to provide a primary-side feedback loop for this embodiment. The reflected-voltage detector 510 generates a signal coupled to a negative terminal of the operational amplifier 515 by sampling the detection signal $V_S$. The detail operation of the primary-side controlled power converter can be found in the prior art of U.S. Pat. No. 7,016,204 titled "Close-loop PWM controller for primary-side controlled power converters". An output signal $V_{ER}$ of the operational amplifier 515 is stored across a capacitor 525 by passing through a switch 520 for generating the signal $V_B$ when the input voltage $V_{IN}$ is higher than a low-threshold $V_{TA}$.

The signal $V_B$ is coupled to the comparator 550 to be compared with a saw-tooth signal $V_{SAW}$ to reset the flip-flop 570 for disabling the switching signal $S_W$. The switching signal $S_W$ is enabled by the pulse signal PLS via the flip-flop 570. The feedback signal obtained from the detection signal $V_S$ is in advance sampled and held as the signal $V_B$ before the input voltage $V_{IN}$ is lower than the low-threshold $V_{TA}$. Therefore, non-linear feedback loop can be avoided. The pulse signal PLS is generated by the pulse generation circuit 250 in response to the detection signal $V_S$ obtained from the auxiliary winding $N_A$ of the transformer 10 and the modulation signal $V_M$ and the control signal $S_{CM}$ generated by the voltage detection circuit 200. The control signal $V_M$ is correlated with the input voltage $V_{IN}$. The maximum frequency of the pulse signal PLS and the maximum frequency of the switching signal $S_W$ are increased in response to the decrement of the modulation signal $V_M$. The control signal $S_{CM}$ is generated once the input voltage $V_{IN}$ is lower than an ultra-low-threshold $V_{TB}$. The control signal $S_{CM}$ indicates the power converter can be operated in CCM to increase the output power $P_O$ and reduce the output ripple when the input voltage $V_{IN}$ is lower than the ultra-low-threshold $V_{TB}$.

Figure 9:
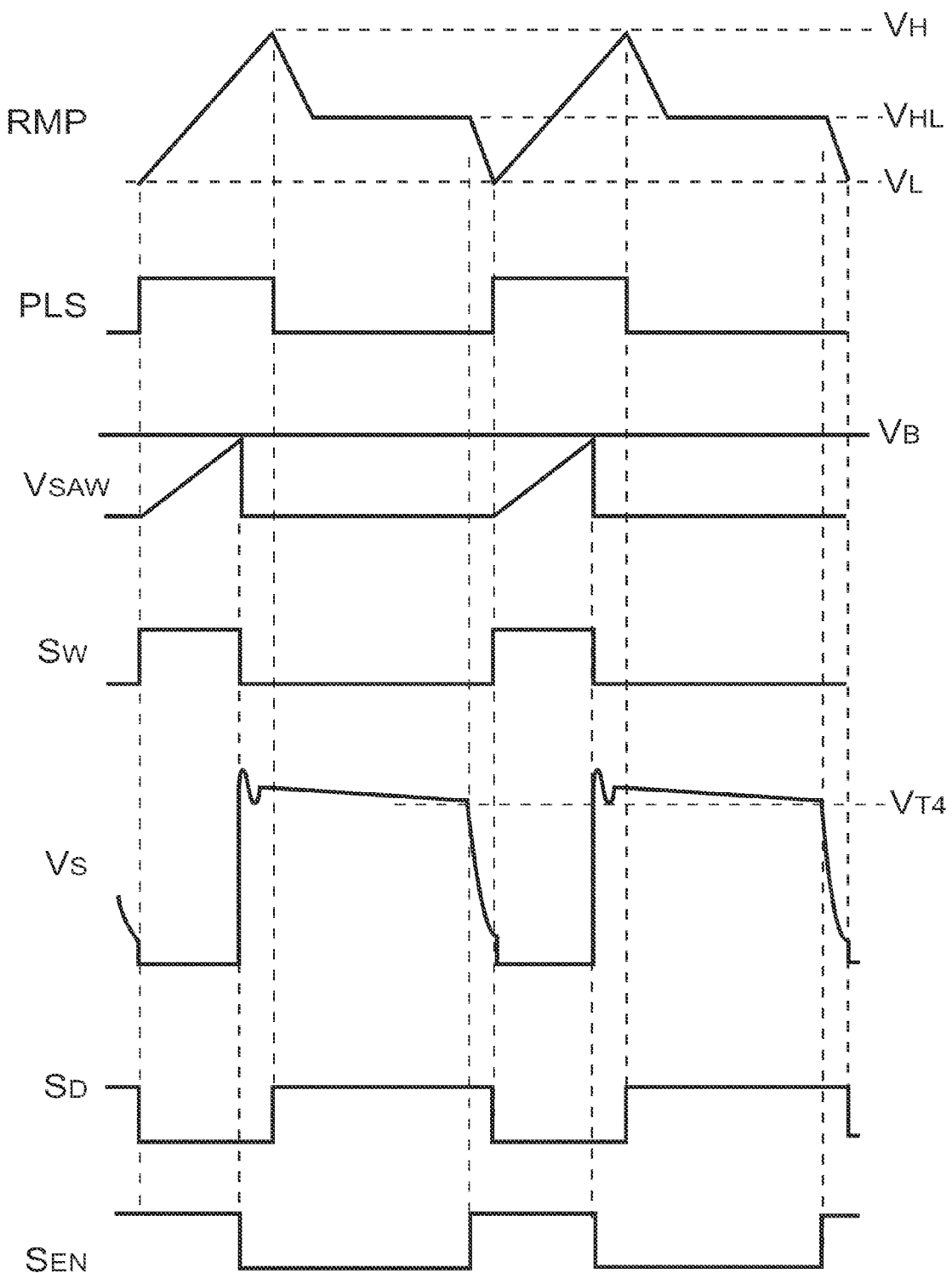
FIG. 9 shows various key waveforms of the flyback power converter.

FIG. 9 shows various key waveforms of the flyback power converter. Both referring to FIG. 6 and FIG. 9, as the pulse signal PLS is enabled, the ramping signal RMP will start to increase with a slope determined by the charging current $I_C$. Once the ramping signal RMP reaches the threshold $V_H$, the discharging signal $S_D$ will be enabled. This will cause that the ramping signal RMP starts to decrease with a first slope determined by the discharging current $I_D$. As the ramping signal RMP decreases to a level of the threshold $V_{HL}$, the discharging signal $S_{DM}$ will be disabled whenever the control signal $S_{CM}$ is not being enabled. This will stop the discharging operation of the capacitor 340 and keep the ramping signal RMP at the level of the threshold $V_{HL}$. Further referring to FIG. 5 and FIG. 9, whenever the detection signal $V_S$ drops to be lower than the fourth threshold $V_{TA}$, the enabling signal $S_{EN}$ will be enabled. This will trigger the fast-discharging signal $S_{FD}$ to discharge the capacitor 340 with a second slope determined by the current of the current source 359.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A switching controller of a flyback power converter comprising:
   a switching circuit generating a switching signal coupled to switch a transformer for regulating an output voltage of said flyback power converter in response to a feedback signal;
   a sample-and-hold circuit coupled to said switching circuit to hold said feedback signal in response to a holding signal; and
   a voltage detection circuit generating said holding signal when a level of an input voltage of said flyback power converter is lower than a low-threshold,
   wherein said feedback signal is generated in response to said output voltage of said flyback power converter.

2. The switching controller as claimed in claim 1, further comprising:
 an oscillation circuit limiting a maximum frequency of said switching signal,
 wherein said maximum frequency is increased in response to a decrement of a modulation signal, and said modulation signal is correlated with said level of said input voltage.

3. The switching controller as claimed in claim 2, wherein said maximum frequency is increased once a level of said modulation signal is lower than a threshold.

4. The switching controller as claimed in claim 1 further comprising:
 a comparator, generating a control signal when said level of said input voltage is lower than an ultra-low-threshold,
 wherein said control signal is enabled to operate said flyback power converter in continuous current mode operation.

5. The switching controller as claimed in claim 4, wherein said flyback power converter is operated in boundary current mode operation and/or discontinuous current mode operation when said level of said input voltage is higher than said ultra-low-threshold.

6. A controller of a power converter comprising:
 a switching circuit generating a switching signal coupled to switch a transformer for regulating an output voltage of said power converter in response to a feedback signal;
 a voltage detection circuit generating a modulation signal in response to a level of an input voltage of said power converter; and
 an oscillation circuit limiting a maximum frequency of said switching signal,
 wherein said feedback signal is generated in response to said output voltage of said power converter, and said maximum frequency is increased in response to a decrement of said modulation signal.

7. The controller as claimed in claim 6, wherein said maximum frequency is increased when a level of said modulation signal is lower than a threshold.

8. The controller as claimed in claim 6 further comprising:
 a sample-and-hold circuit coupled to hold said feedback signal in response to a holding signal,
 wherein said voltage detection circuit generates said holding signal when said level of said input voltage is lower than a low-threshold.

9. The controller as claimed in claim 6 further comprising:
 a comparator generating a control signal when said level of said input voltage is lower than an ultra-low-threshold,
 wherein said control signal is enabled to operate said power converter in continuous current mode operation.

10. The controller as claimed in claim 6, wherein said power converter is operated in boundary current mode operation and/or discontinuous current mode operation when said level of said input voltage is higher than an ultra-low-threshold.

11. A control circuit of a power converter comprising:
 a switching circuit generating a switching signal coupled to switch a transformer for regulating an output voltage of said power converter in response to a feedback signal;
 a voltage detection circuit generating a modulation signal in response to a level of an input voltage of said power converter; and
 a comparator generating a control signal when a level of said modulation signal is lower than an ultra-low-threshold,
 wherein said feedback signal is generated in response to said output voltage of said power converter, and said control signal is enabled to operate said power converter in continuous current mode operation.

12. The control circuit as claimed in claim 11, wherein said power converter is operated in boundary current mode operation and/or discontinuous current mode operation when said level of said input voltage is higher than the ultra-low-threshold.

13. The control circuit as claimed in claim 11, further comprising:
 an oscillation circuit limiting a maximum frequency of said switching signal,
 wherein said maximum frequency is increased in response to a decrement of said modulation signal, and said modulation signal is correlated with a level of said input voltage.

14. The control circuit as claimed in claim 13, wherein said maximum frequency is increased when said level of said modulation signal is lower than a threshold.

15. The control circuit as claimed in claim 11 further comprising:
 a sample-and-hold circuit coupled to hold said feedback signal in response to a holding signal,
 wherein said voltage detection circuit generates said holding signal when said level of said input voltage is lower than a low-threshold.

\* \* \* \* \*